Figure 3:
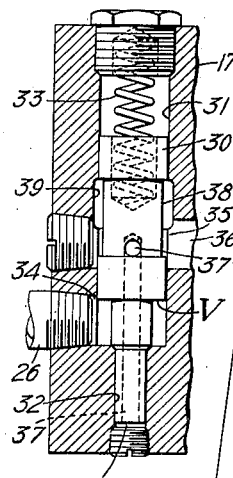

Jan. 14, 1936.  L. L. SCHAUER ET AL  2,027,706
COUNTERBALANCE VALVE
Filed Sept. 11, 1934   3 Sheets-Sheet 1
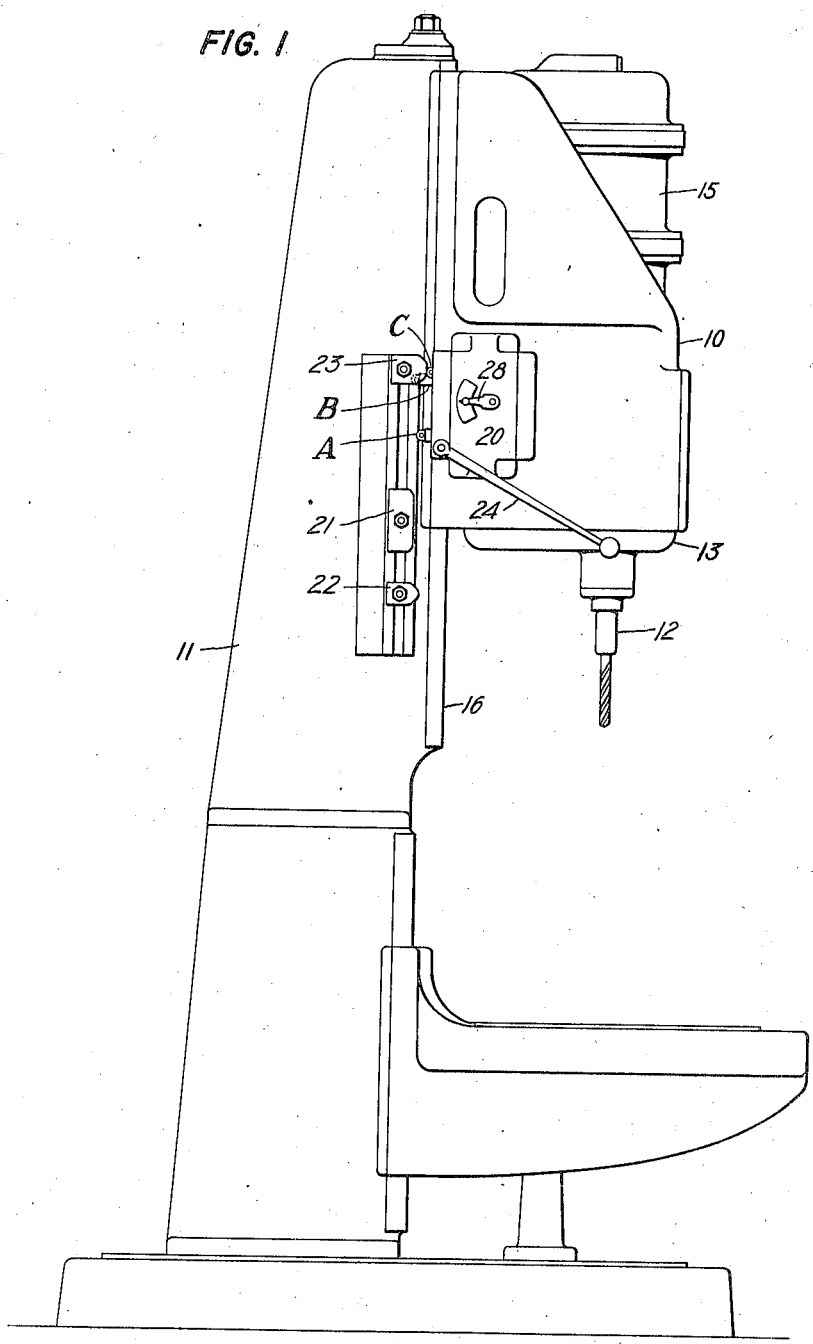

Jan. 14, 1936.  L. L. SCHAUER ET AL  2,027,706
COUNTERBALANCE VALVE
Filed Sept. 11, 1934   3 Sheets-Sheet 2

INVENTORS
Lawrence L. Schauer
BY John H. McKewen
Nathan, Bowman & Helferich
ATTORNEYS

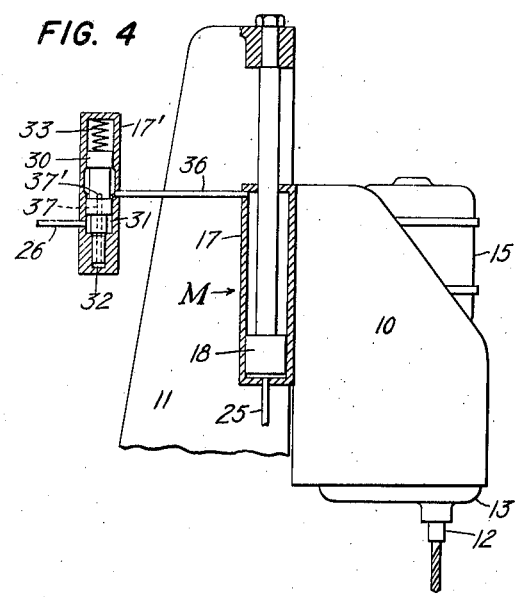
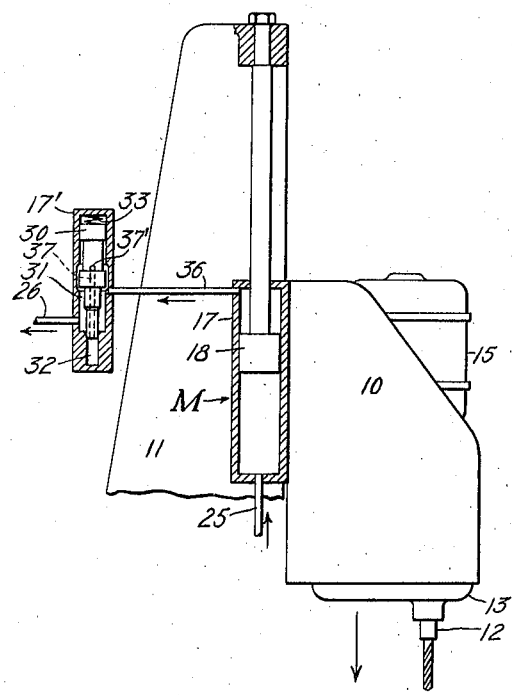
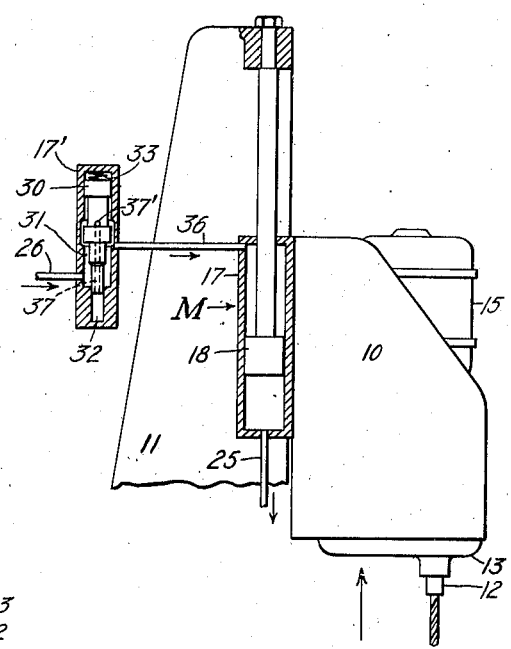

Patented Jan. 14, 1936

2,027,706

UNITED STATES PATENT OFFICE 2,027,706

COUNTERBALANCE VALVE

Lawrence L. Schauer, Wyoming, and John H. McKewen, Cincinnati, Ohio, assignors to The Cincinnati Bickford Tool Company, Cincinnati, Ohio, a corporation of Ohio Application September 11, 1934, Serial No. 743,532

9 Claims. (Cl. 121—45)

This invention relates to an improvement in counterbalancing mechanisms for movable elements of machine tools and more particularly to counterbalancing mechanisms for use in connection with hydraulically propelled machine elements.

The primary aim of the invention is to secure a balance between the hydraulic forces acting within the propelling motor and the opposing force of gravity so that whenever the propelling forces are discontinued, irrespective of the cause, the movement of the propelled element automatically ceases and the element thereafter maintained definitely at rest.

A further object of the invention is to prevent injury to an operator or damage to the machine tool or workpiece by reason of the propelled element falling in the event of an accidental breakage or discontinuance in the forces normally sustaining and/or controlling the elements' further movements.

Still another object of the invention is to eliminate the need of conventional counterweighting devices such as counterweights, springs, etc. and to provide a simple, compact mechanism having all the advantages of those prior devices without their attendant disadvantages, and a mechanism which may be inexpensively constructed and incorporated in existing propulsion systems.

In achieving these and other objects of the invention hereinafter to be mentioned, it is proposed to incorporate in that line of the hydraulic transmission system, which would normally be the high pressure line when the propelled element is moving uncontrolledly, as by the force of gravity, a pressure responsive valve of the differential piston type adapted automatically to close that line from the exhaust whenever the hydraulic pressure within the line ahead of the valve falls below a predetermined pressure value, which pressure value, it will be understood, is normally higher than the pressure induced in the line by the force of gravity acting alone. In this way a safety mechanism of a very compact nature is provided which automatically seals the discharging side of the hydraulic motor and prevents the discharge of fluid in emergencies, and also during the normal operation as, for example, when the control elements of the transmission are shifted from one position to another. As a consequence movement of the propelled element is restrained from moving uncontrolledly during such transitional periods and likewise when the emergency arises.

In this respect the present invention differs in function from the action of the conventional counterweighting devices, for in the latter devices it is practically impossible to so adjust the weights or the tension of the springs employed to that precise value which accurately counterbalances the member that is moved. In practice the counterweighting mechanisms have been found to have either an overbalancing effect or an underbalancing effect upon the member. In the one case, the member moves up when the drive is disconnected, and in the other case the member will move down when the drive is disconnected, but in both cases the propelled member is not positively maintained in a position of rest when the drive is suspended.

The present invention undertakes to overcome the above mentioned uncertainties in action by an hydraulically responsive device which operates automatically to close the discharge side of the power cylinder from the exhaust the moment the propelling pressure is relieved, as for example, by the stopping or the bypassing of the pump, the operation of rate changing or reversing mechanisms, or by undue leakage, or by the bursting of a fluid connection. In any of these instances this invention operates instantly to seal one end of the motor and prevents ingress or egress of fluid and the motor and parts connected therewith immediately stops.

To avoid numerous pipe connections the safety valve occupies a position preferably within the cylinder head of the propelling motor. It could, of course, be located elsewhere and satisfactorily perform its intended functions. When, however, the valve is located in the cylinder head, it is convenient to form the fluid connections between the valve and motor by drilled conduits and thereby avoid one or more points where leakage may occur. The preferred form of valve comprises a piston valve element of the differential type in which one area thereof is normally subjected to the pressure of the fluid discharged by the motor, and the other area is subjected to the pressure of the fluid entering the motor during the reverse movement thereof. Movement of the valve toward its open position is opposed by a small spring and when the pressure of the fluid acting upon one of the valve areas rises to a value overcoming the spring, the valve opens and establishes communication between the motor and the fluid conduit and movement of the motor results. When the pressure in the line drops, the spring urges the valve toward its closed position and ingress of fluid to the motor is definitely stopped.

The present invention is particularly adaptable for use in connection with drilling machines, for in such types of machines the drill spindle or spindles frequently must be arranged at various angles and positions in order to perform the drilling operations required. And, as a plurality of drill heads are often arranged at different angles about a single workpiece, the problem of accurately counterbalancing the several tool heads presented serious difficulties, among which was the lack of space sufficient to accommodate a counterweighting mechanism of the required size, and the difficulty of constructing the supporting structure heavy enough and strong enough to carry the weight of the counterweight, in addition to the normal load. A further aim of this invention is to eliminate the need for such bulky heavy constructions above mentioned and to make it possible to effect a more compact and close arrangement of the tool units about a given workpiece.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
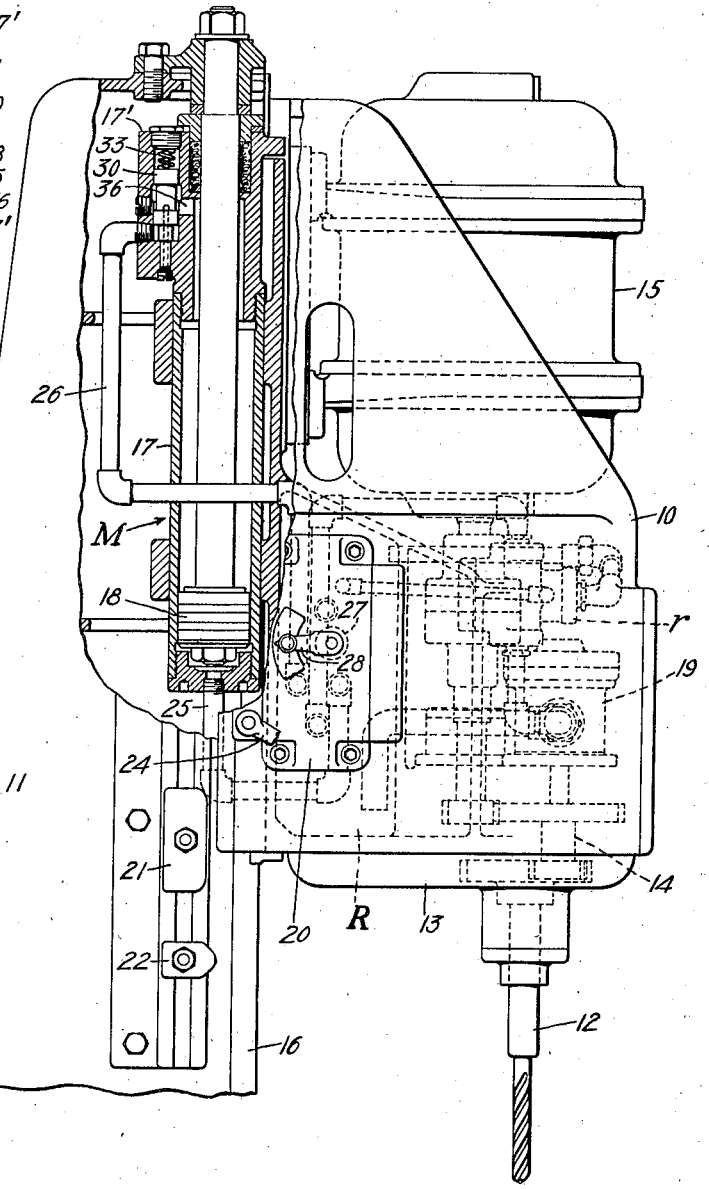

Fig. 1 represents an upright drill to which the present invention is particularly adapted. Fig. 2 is an enlarged portion of Fig. 1 showing certain parts of the mechanism in section. Fig. 3 is an enlarged view of a preferred form of counterbalance valve mechanism suitable for carrying out the objects of this invention. Figs. 4, 5 and 6 are diagrammatic views illustrating various operating positions of the counterbalance valve.

Figure 1 of the drawings represents a typical embodiment of this invention and in which the numeral 10 indicates a tool head unit to be counterbalanced and 11 the supporting column for the unit. In this disclosure, the tool head is arranged to carry one or more drill spindles 12 which are rotatably journaled in the bracket 13 and driven through gearing 14 by a motor 15 which is also mounted upon and carried with the tool head 10.

To move the tool head along the ways 16 formed on the column 11, an hydraulic propulsion system is provided which, in general, comprises a motor M which includes a cylinder 17 secured to the translatable head and a piston 18 fixedly secured to the column 11, and a pump 19 for supplying fluid under the control of a valve mechanism 20 to the motor M. The pump 19 is driven at a constant speed from the spindle motor 15, and drawing fluid from a reservoir R, also carried by the translatable head, delivers at a constant rate to the valve mechanism 20 and thence to the motor M. The unused surplus supplied by the pump passes to the reservoir through a pressure relief valve r. The return from the motor M during a "feed" movement passes to the reservoir R through a rate control valve 27 embodied in the valve mechanism 20 as is common in systems of this character.

Thus it will be seen that the translatable head 10, in addition to carrying the tool spindle and spindle drive means, carries also the entire transmission mechanism for propelling the spindles toward and away from the work. This unitary construction has the advantage of enabling the unit to be placed at any desired angle and/or in groups of as many units as may be desired, each unit being self-contained and operating independently from any other unit.

A normal cycle of translatory movement of any given unit is as follows: rapid traverse of the tools forward, to bring them into close proximity with the work; feed forward, which continues until the tooling operation is completed; rapid traverse reverse, to remove the tools from the work and away; and stop, in an upper retracted position. This typical cycle is controlled automatically by means of the valve plungers A, B and C in the valve box 20, and their cooperating trip dogs 21, 22 and 23. A starting lever 24 is provided which, when moved by the operator to its start position, actuates the plunger A to a position such that fluid from the pump 19 is caused to pass through the conduit 25 to the large end of the cylinder and propel the head forward at a relatively rapid rate. The fluid discharged from the small end of the cylinder passes through line 26 to the valve box and thence to the reservoir. As the head moves forward the valve plunger B strikes a feed dog 21 and is moved thereby to a position which shunts the flow of fluid in the line 26 through a rate control valve 27, in the valve box 20. The function of the valve 27 is to reduce the rate of motor discharge whereupon the tool head continues forward at a reduced rate, the rate of feed being predetermined by the setting of a feed control lever 28.

At the end of the feeding movement, plunger A engages the reversing dog 22 by which it is actuated to a position effecting a reversal in the fluid connections between pump and motor and the tool head moves away from the work at a rapid rate. The conduit 26 now becomes the forward pressure line and conduit 25 the motor discharge line.

The retracting movement continues until the plunger C engages the dog 23 which actuates the plunger to position effective to discontinue the supply to the motor and the tool head is brought to rest in its retracted position.

The hydraulic system and valve mechanisms above explained generally, represents a typical hydraulic circuit to which the present invention is well suited. As the valve mechanisms and other elements of the hydraulic system disclosed are standard parts of a well known make, further detailed description thereof has been omitted in the interest of clarity. It will be understood, however, that the invention is equally well adapted to other hydraulic systems since the particular type of system does not effect the operation of the counterbalance device.

When the drill units are arranged so that the spindle or spindles translate in inclined paths or in vertical paths each unit must be counterbalanced so that the head will not slide forward uncontrolledly when the power is discontinued. This invention accomplishes that end in an exceedingly simple and effective manner and without resort to the bulky and cumbersome counterweighting devices heretofore used.

A preferred form of hydraulic counterbalance device comprises a pressure responsive piston valve of a differential type. As shown more clearly in Figs. 2 and 3 the piston valve includes a valve element 30 slidably mounted in a bore 31 formed preferably in one of the cylinder heads 17', although a separate casing may be employed, if desired. The piston element 30 is formed with two different diameters, one diameter V, fitting the bore 31 and the other and smaller diameter $v$ fitting a coaxial bore 32. The two diameters V and $v$ are adapted to be subjected to fluid pressure which tends to move the valve element 30 in one direction against the force exerted by a spring 33, the tension of which may be varied to suit the weight factor of the member to be counterbalanced. Ports 34 and 35 are provided in the valve, one port 34 communicating with the bore 31 below the diameter V, and the other port 35 communicating with the bore 31 at a point intermediate the ends of the large diameter V.

In the present embodiment the differential valve is placed in the fluid line communicating with the small end (rod end) of the hydraulic motor M, and when so connected the line 26 communicates with the port 34 and the chamber below the diameter V. Since the valve mechanism is built into the cylinder head 17' of the motor, the port 35 communicates directly with the interior of the motor by means of the passage 36. The chamber 32 below the area $v$ of the valve also communicates with the interior of the motor M by means of an axial passage 37 formed in the movable element 30.

The passage 37 intersects a cross port 37', which, in turn, communicates with an annular goove 38 formed in periphery of the larger portion of the piston valve. The annular groove 38 communicates, at all times, with the port 35 and the fluid within the motor cylinder through a second annular groove 39 formed upon the inner wall of the bore 31 which is made wide enough to maintain fluid communication between the port 35 and the axial passage 37 in the plunger 30 in any axial position taken up by the plunger. Accordingly, whatever be the pressure of the fluid in the small end of the motor, the same pressure will exist in passages 36 and 37 and the chamber 32. The construction embodying the passage 37 and the cooperating grooves 38 and 39 is, from a practical standpoint, preferred over the construction in which the conduit 37 is located outside of valve casing for the reason that the pressure in the conduit 36 acts equally on all sides of the plunger 30 and equalizes the lateral thrusts thereon, thereby minimizing the tendency toward sticking.

When the valve element 30 assumes a position closing off the port 35, no flow takes place through the valve. On the other hand, when the fluid pressure exerted upon the areas V—$v$ is sufficient to overcome the value of the spring 33, the valve element moves to a position uncovering the port 35 and flow between ports 34 and 35 of the valve may take place.

The manner in which the counterbalance valve operates will be more readily understood in connection with the diagrammatic Figures 4, 5 and 6.

Figure 4 illustrates diagrammatically the position of the parts when the head is in a retracted position, the counterbalance valve is closed and consequently the head is prevented from moving in either direction. For the present purposes, the normal pressure P in pounds per square inch existing in the small end of the motor M, may be determined by the formula $$\frac{W}{a},$$

where W=the weight of the head in pounds and $a$ the area of the surface of the piston on the rod side (small end of the motor). Since the pressure P acts upon the area $v$ of the counterbalance valve, the force $f$ tending to open the valve is P×$v$. The spring 33, however, exerts an opposing force S upon the valve plunger and which force, for the purpose of this illustration, is 10 pounds greater than the force $f$, therefore $$\left(\frac{W}{a} \times v\right) + 10 = S,$$

and the parts are in a state of equilibrium.

By way of example, if W=1,500 pounds; $a$=5 square inches; $v$=.1503 square inch (for convenience in manufacture); and S=55#, the net force tending to open the valve will be 45 pounds as against 55 pounds tending to hold the valve closed. Consequently, when no outside forces are applied the valve remains closed, thus preventing the escape of fluid from the upper end of the hydraulic motor and the motor and parts connected therewith remain stationary.

To open the counterbalance valve, a force is necessary to raise the pressure in the upper end of the motor cylinder to a value sufficient to overcome the force of the spring S and which, according to the formula $$\left(\frac{W}{a} \times v\right) + 10 \text{ pounds},$$

is, in this example, a pressure of 365 pounds. In order to obtain that pressure a total force acting downwardly of 1,825 pounds is required and since the weight of the head furnishes 1,500 pounds, the difference is made up hydraulically by directing fluid under pressure to the large end of the motor. If the area A of the face of the piston 18 is 7.06 sq. in., a minimum pressure of 46 lb. per sq. inch is required to produce a total downwardly acting force of 325 lbs. on the unit which, together with the 1,500 lbs., the normal weight of the head, gives 1,825 lbs., the total force required in the small end of the motor to open the counterbalance valve and allow the head to proceed forward.

Since the fluid discharged from the motor through the passages 36 and 26 passes to the reservoir the head moves toward the work at a relatively rapid rate until the plunger B engages the feed dog 21. When that occurs the motor discharge is shunted through the rate control valve 27 and the rate of motor discharge limited thereby to the rate required to effect a feeding movement of the tools.

When the tools engage the work and start the tooling operation, a portion, if not the entire weight of the head, no longer is effective to assist in the forward movement and a correspondingly larger fraction of the force required to open the counterbalance valve must be supplied hydraulically. In the example indicated by Fig. 5, the resistance offered by the workpiece is assumed to equal the weight of the head and under such a condition the supply pressure acting upon the area A of the piston, in order to open the valve and continue the forward movement, must be approximately 258.5 lb. per sq. inch. After the valve is opened the pressure of the liquid flowing through the valve acts upon the large area V of the valve and also tends to hold the valve open. Consequently, the unit pressure required to hold the valve open during the movement of the member is less than the pressure required to open the valve initially.

Fig. 6 illustrates the positions of the parts during the rapid traverse up movement of the head and for this condition the fluid connections to the motor are reversed, as illustrated by the arrows. Line 26 is the fluid supply line and line 25 is the fluid discharge line, discharging directly to the reservoir R.

To elevate the tool head in the example given, a pressure of slightly more than 300 lbs. per sq. inch is required in the small end of the hydraulic motor M. A similar pressure must, therefore, be maintained in the conduit 26, and this pressure acting upon the large area V of the counterbalance valve (which, in this example, is .6351 sq. in. for convenience in manufacture) is more than adequate to actuate the valve to its open position and allow the supply fluid to enter the small end of the motor M to retract the head and tools. When the head reaches its retracted position plunger A of the valve box is shifted to a position effecting a bypassing of the supply fluid to the reservoir. The pressure acting upon the area V of the counterbalance valve is thereupon relieved and it closes, fluid is trapped in the upper end of the motor and the head stops and is maintained in that position until the cycle is again started.

When the supply pressure in conduit 26 is cut off, either by accident or design, the spring 33 urges the valve to its closed position. Likewise, when the conduit 25 is the supply conduit, should the pressure therein drop below the minimum values selected, the counterbalance valve closes and again the spindle is brought to rest.

From the above it will be seen that the counterbalance valve occupies a very small space, is easily constructed and readily adapted to various hydraulic systems now in use and, considering the complicated functions which it performs, it is extremely reliable in its action.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of the United States:—

1. An hydraulic system for propelling an element in a direction opposed to the force of gravity including an hydraulic motor comprising a fixed piston and a translatable cylinder; a fluid supply conduit; valve means in said conduit comprising a casing member and a valve element movable therein; power means normally tending to move said element to a valve-closed position; said valve element being provided with two pressure responsive areas, fluid connections between one of said areas and the intake side of said hydraulic motor, fluid connections between the other of said areas and said supply conduit, said areas being so proportioned that the sum of the hydraulic forces acting thereon overcomes said power means and maintains said valve element in its open position whereby said fluid supply is permitted to enter said motor to propel same.

2. An hydraulic system including an hydraulic motor provided with an inlet and a discharge conduit for propelling machine tool element combining a counterbalancing valve located in one of said conduits comprising a casing, a valve element movable therein, said element being provided with two pressure responsive areas of different sizes whereby said element is rendered more sensitive to movement by a unit variation in fluid pressure acting upon one of said areas than upon the other; a fluid connection between one of said areas and the said conduit; and a fluid connection between the other of said areas and the interior of said motor.

3. In an hydraulic system including an hydraulic motor provided with a discharge conduit for propelling a machine tool element the combination of a counterbalancing valve located in said discharge conduit and forming a part thereof comprising a casing, a valve element movable therein, said element being provided with two pressure responsive areas of different sizes whereby said element is rendered more sensitive to movement by a unit variation in fluid pressure acting upon one of said areas than upon the other; a fluid connection between one of said areas and said discharge conduit at one side of the valve and a fluid connection between the other of said areas and the interior of said motor at the other side of said valve.

4. In an hydraulic system for propelling an element selectively in reverse directions and in which reversing valve means is embodied for effecting said reversals, the combination of an hydraulic motor operatively connected with the element; a source of fluid supply; fluid connections between said source and said motor, one of said connections being a motor inlet connection and another of said connections being a motor exhaust connection, the direction of flow through said connections being reversed when the valve means is actuated to effect a reversal in movement of the motor and element connected therewith; and pressure responsive valve means embodied in one of said connections for stopping the flow therethrough and sealing the motor against exhaust when the pressure of the fluid in said motor falls below a preselected value irrespective of the direction of the flow of fluid in said connection, said valve means having a piston element therein provided with an area normally subjected to the pressure of the fluid above the valve and an area normally subjected to the pressure of the fluid below the valve; and means normally acting on said piston element in opposition to the fluid pressures acting on said areas.

5. In a machine tool having an element adapted to be moved and upon which the force of gravity acts, and in which an hydraulic motor of the differential piston type, a fluid supply conduit and a fluid exhaust conduit having rate and direction control means embodied therein are provided for propelling said element at various rates of speed selectively in reverse directions, the combination of counterbalancing valve means embodied in one of said conduits between the motor and the rate and direction control means responsive automatically to variations in the fluid pressure in the motor and in said conduit and operative to close the said conduit of said motor against intake or exhaust when the pressure ahead or behind the valve falls below a predetermined value, irrespective of the direction or rate of flow through the said valve, said valve means having a piston valve element therein provided with pressure responsive areas of different sizes, one of said areas being normally subjected to the pressure of the fluid in the motor, and another of said areas being normally subjected to the pressure of the fluid in said conduit; and means normally tending to maintain said piston valve element in valve closed position in opposition to the pressures acting on said areas.

6. In a machine tool having an element adapted to be moved and upon which the force of gravity acts, the combination of an hydraulic motor of the differential piston type for propelling said element; a fluid supply and a fluid exhaust conduit for said motor; normally closed counterbalancing valve means embodied in said exhaust conduit having a piston valve plunger therein provided with areas responsive automatically to variations in the pressures at the upstream and downstream side of the valve respectively and operative to seal said motor against exhaust due to the force of gravity when the pressure at either side of the valve falls below a predetermined value, the pressures reacting against said areas tending normally to move said plunger to a valve opened position; and means for applying a force on said element in addition to the force of gravity acting thereon to thereby induce a pressure in the exhaust side of said motor of a value sufficient to open said counterbalance valve thereby to effect movement of said motor and the element propelled thereby.

7. A counterbalancing device adapted to be embodied in one of the fluid control lines of an hydraulic system for the propulsion of a machine tool element combining a valve casing provided with inlet and discharge ports, and a valve element movable therein, said element being provided with two pressure responsive areas of different sizes whereby said element is rendered more sensitive to movement by the pressure exerted upon one of said areas than upon the other; fluid connections between each of said areas and one of said ports; and means exerting a force of a predetermined value on said valve element in opposition to the hydraulic forces exerted on said areas, said element being less sensitive to opening when the flow through the valve is in one direction than when the flow through the valve is in the other direction whereby said machine tool element is prevented from moving when the pressure acting upon either of said areas falls below a predetermined value.

8. In a counterbalancing system for an hydraulically propelled member the combination of valve mechanism comprising a casing provided with an inlet and a discharge port; a piston valve element movable in said casing, said valve element being provided with two pressure responsive areas of unequal size; means exerting a force upon said valve element of a predetermined value normally tending to move said valve element to a valve-closed position in opposition to the pressures acting upon said areas; and fluid connections between each of said ports and one of said areas whereby said valve element will be moved to a valve-open position when the pressure on either of said areas reaches a value greater than the force normally tending to hold the valve closed.

9. In an hydraulic system for propelling an element upon which the force of gravity acts, the combination of an hydraulic motor connected with said element; a liquid supply and a liquid exhaust conduit for said motor; and valve means in said exhaust conduit responsive automatically to variations in pressure in the exhausting side of the motor and normally operative to seal said motor against exhaust when the pressure in the exhaust side of said motor falls below a predetermined value, comprising a valve casing, a valve element movable therein, an inlet port in said casing arranged transversely to the direction of movement of the said valve element and in which the flow of liquid therethrough normally tends to bias said valve element against one of the side walls of the casing, a liquid discharge port in said casing, and means provided by said casing for equalizing the biasing effect of the liquid entering said inlet port on said valve element in all of its positions in said casing.

LAWRENCE L. SCHAUER.
JOHN H. McKEWEN.